US012599789B2

(12) United States Patent
Allen

(10) Patent No.: US 12,599,789 B2
(45) Date of Patent: Apr. 14, 2026

(54) RESCUE ACCESS WEDGE

(71) Applicant: Jason Allen, Kelso, WA (US)

(72) Inventor: Jason Allen, Kelso, WA (US)

( * ) Notice: Subject to any disclaimer, the term of this patent is extended or adjusted under 35 U.S.C. 154(b) by 267 days.

(21) Appl. No.: 18/135,632

(22) Filed: Apr. 17, 2023

(65) Prior Publication Data

US 2023/0330447 A1 Oct. 19, 2023

Related U.S. Application Data

(60) Provisional application No. 63/331,304, filed on Apr. 15, 2022.

(51) Int. Cl.
*A62C 8/00* (2006.01)
*A62B 3/00* (2006.01)

(52) U.S. Cl.
CPC ................ *A62B 3/005* (2013.01); *A62C 8/00* (2013.01)

(58) Field of Classification Search
CPC .................................... A62C 8/00; A62C 3/00
See application file for complete search history.

(56) References Cited

U.S. PATENT DOCUMENTS

| | | | | |
|---|---|---|---|---|
| 5,600,914 A * | 2/1997 | Tatar | A01K 97/00 | 81/439 |
| 7,793,378 B1 * | 9/2010 | Kirby | E04F 21/1652 | 29/270 |
| 8,393,596 B2 * | 3/2013 | Lindskog | A62B 3/005 | 7/151 |
| D731,273 S * | 6/2015 | McPeak Ford | D8/402 | |
| D834,909 S * | 12/2018 | Poulos | D8/78 | |
| D968,922 S * | 11/2022 | Stoll | D8/47 | |
| 2011/0062400 A1 * | 3/2011 | Lindskog | A62B 3/005 | 29/253 |
| 2023/0330447 A1 * | 10/2023 | Allen | A62C 8/00 | |

* cited by examiner

*Primary Examiner* — Lee D Wilson
(74) *Attorney, Agent, or Firm* — Apex Juris, pllc; R. Lynette Wylie

(57) ABSTRACT

A rescue access wedge having a base portion, a rear portion and a front portion with a pair of opposed generally triangular sidewalls upwardly extended from the base portion wherein the sidewalls taper from the rear portion to a tip connecting the pair of opposed side surfaces and wherein a pair of aligned slots disposed on opposed sidewalls are adjoined for coupling with paired prongs a fork end of a rescue tool and a concavity or notch disposed in a top and/or bottom surface configured to seat this rescue access wedge upon an abutting surface and a method of use thereof.

20 Claims, 6 Drawing Sheets

RESCUE ACCESS WEDGE

FIELD OF THE INVENTION

The present invention pertains to rescue tools for use by firefighters and other first responders to conduct emergency operations, and in particular, a wedge to enable forcible entry into buildings and hold open doors.

BACKGROUND OF THE INVENTION

Firefighters, among other first responders, are responsible for rapid and resourceful responses to many diverse emergency situations often involving rescues of entrapped persons in precarious and sometimes life-threatening situations. In fighting fires in a structure, a firefighter must take precautions for his own safety and that of others, but at the same time move as rapidly and efficiently as possible. In many emergency situations including fires, tools to open locked doors are needed to enable an access and escape route for fire, trapped individuals, and venting smoke or toxic fumes.

A firefighter must also be able to secure the door in an open position quickly and securely in order to prevent a door closing unexpectedly that may pinch off the water supply to a fire hose, prevent ventilation of fire gases and smoke, and possibly lock behind the firefighter, trapping her or him in the building.

A further need of rescue workers is for a compact and lightweight mechanism for swift prying of a gap between a door side edge adjacent to the lock and door frame to insert lock releasing blade or to impede automatic door closing mechanisms and thereby enhance escape of poisonous fumes as well as trapped victims in a burning structure. Unfortunately, however, prior art tools for forcible entry are heavy and unwieldy. In particular, the weight of steel wedges may delay or impede swift insertion under or behind or swift prying of a gap between a door side edge adjacent to the lock and door frame to insert lock releasing blade or to impede automatic door closing mechanisms and thereby enhance escape of poisonous fumes as well as trapped victims in a burning structure.

Due to the rapidly expanding scope and number of emergencies, there is a persisting and urgent need for a lightweight and compact facile rescue tool that can be leveraged to amplify the force and hence efficacy in forcible entry and is capable of wedging and thereby propping open doors, windows and mechanisms blocking access to spaces, water and fire retardant pipes and reservoir and similar secured entryways and agents. Due to such increased number of calls and the increased endurance needed by firefighters in order to maintain rapid and strong performance during rescue operation while being weighed down by heavy construction of turnout gear rescue tools, there remains a persisting and urgent need for a streamlined tools, including a wedge tool that is strong yet lightweight and compact that is capable of prying and propping open doors, windows and mechanisms blocking access by first responders to endangered spaces. It can thus be readily seen that providing a fire fighter or other first responder with a rescue tool enabling quick and smooth rescue, problems delaying entry through locked doors and keeping doors and passageways open during a rescue operation remain

SUMMARY OF THE INVENTION

Addressing such and other drawbacks in the prior art, the present invention is directed toward a rescue access wedge having a base portion, and a pair of opposed generally triangular sidewalls upwardly extended from the base portion and a method for use thereof. The various embodiments include a generally triangular-shaped body with sidewalls tapering from a rear portion to a tip in a front portion connecting the pair of opposed side surfaces and aligned slots disposed on opposed front and back surfaces are adjoined for coupling in a slot between two prongs a fork lever end of a halligan bar or other rescue tool. The rescue access wedge of the present invention may further feature at least one concavity or notch disposed in a top and/or bottom surface configured to seat this rescue access wedge upon an abutting surface to prevent pushing or driving it through a gap or material.

Embodiments of the recited method thereby leverage compressive force for wielding during rescue operations such as, for example forcible entry through a locked door or otherwise blocked passage. Embodiments of the method enhance forcible prying and opening by thus leveraging applied force imparted, for example, by striking the halligan bar and/or the rescue access wedge itself. The combination of leveraging force by pulling and pushing a coupled halligan bar while striking the back of the wedge enhances the force applied to the rescue wedge to thereby facilitate forcible entry through a locked door, including highly secured, heavy duty doors of steel or similar materials or otherwise reinforced construction.

Various embodiments of the rescue access wedge may include least one hole or a plurality of holes. In some embodiments, one or more holes is disposed in the base portion. Thee at least one hole may be tapered to form a teardrop shape. Edges of the hole may be beveled in a gradual upward taper from the edge.

In some embodiments, the interior area of the triangular-shaped body within the base portion and sidewalls is hollow.

Many embodiments include at least two holes aligned in opposed sidewalls of a rear portion such that the two holes are capable of receiving a tether line for securing an object Examples of such an object include a ladder, a lead line, a person, or an unstable wall or structure.

Various embodiments of the rescue access wedge feature transverse recessed columns of two opposed slots are configured for receiving a fork end of a rescue tool such as, for example, a halligan bar.

Other features of the various embodiments may include a non-slip surface with, for example, a texture, dimples, or ripples on at least one side of the triangular-shaped body has a non-slip surface for gripping.

Embodiments may also include buoyant material for flotation.

Additional features of various embodiments may include reflective, luminescent, fluorescent material for visibility in a low light condition.

Various embodiments of this rescue access wedge feature one or more empty spaces or cavities between the inner surfaces of the bottom and top layers and side surfaces configured to impart ample strength and stability while reducing weight and cost of materials and construction and to provide further functionalities as described in detail below.

A particularly advantageous feature of the various embodiments are aligned holes in opposed side surfaces of the tall back portion providing anchor points to tether for a ladder when the front end is embedded in a stable material. The angling of the front portion buttresses and thus prevents slippage of the bottom of the ladder.

The present invention thus provides a multi-purpose, lightweight and facile forcible entry and access tool.

DETAILED DESCRIPTION OF THE VARIOUS EMBODIMENTS

Figure 1:
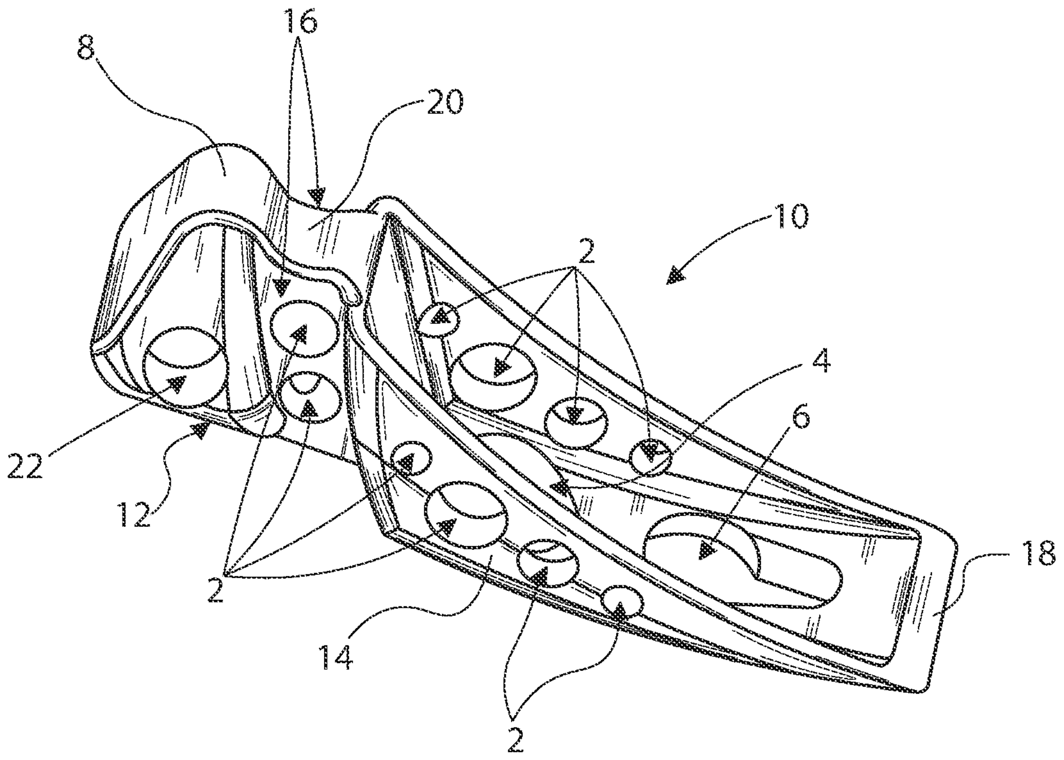
FIG. 1 is a top perspective view of the illustrated embodiment of rescue access wedge according to the present invention.
Figure 2:
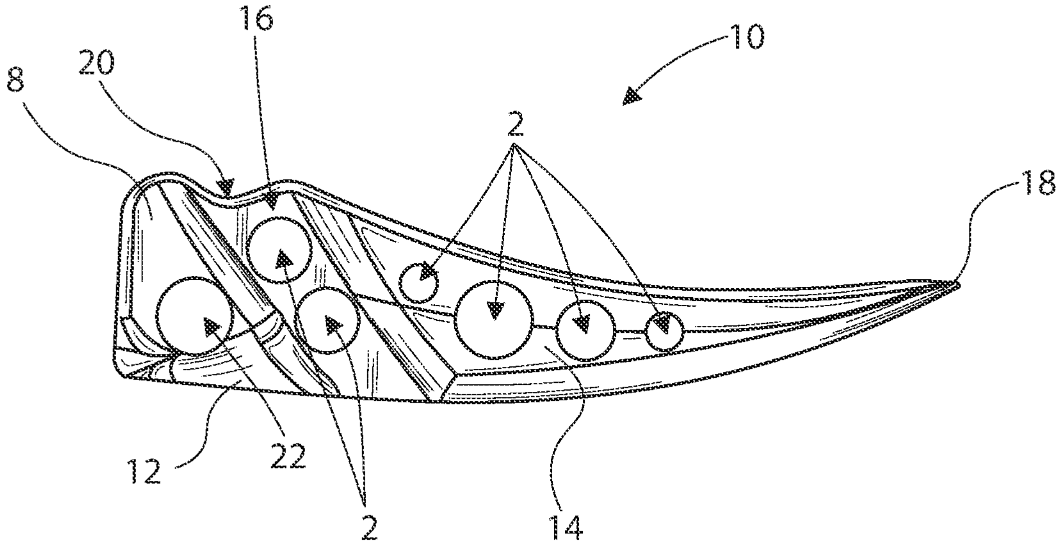
FIG. 2 is a side view of the rescue access wedge.
Figure 3:
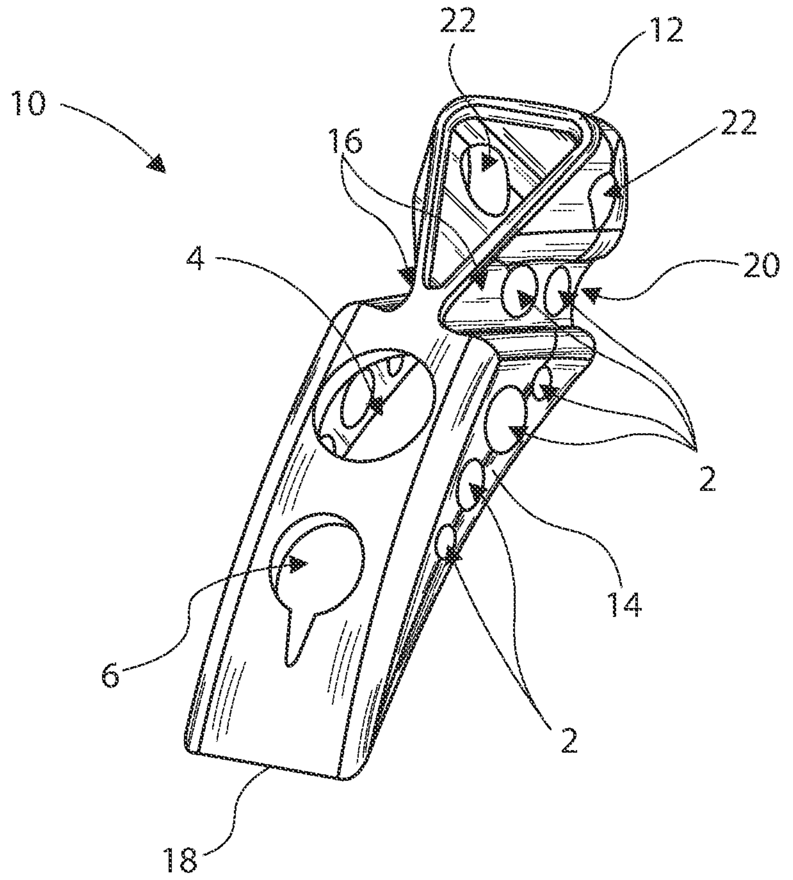
FIG. 3 is a bottom view of the rescue access wedge.
Figure 4:
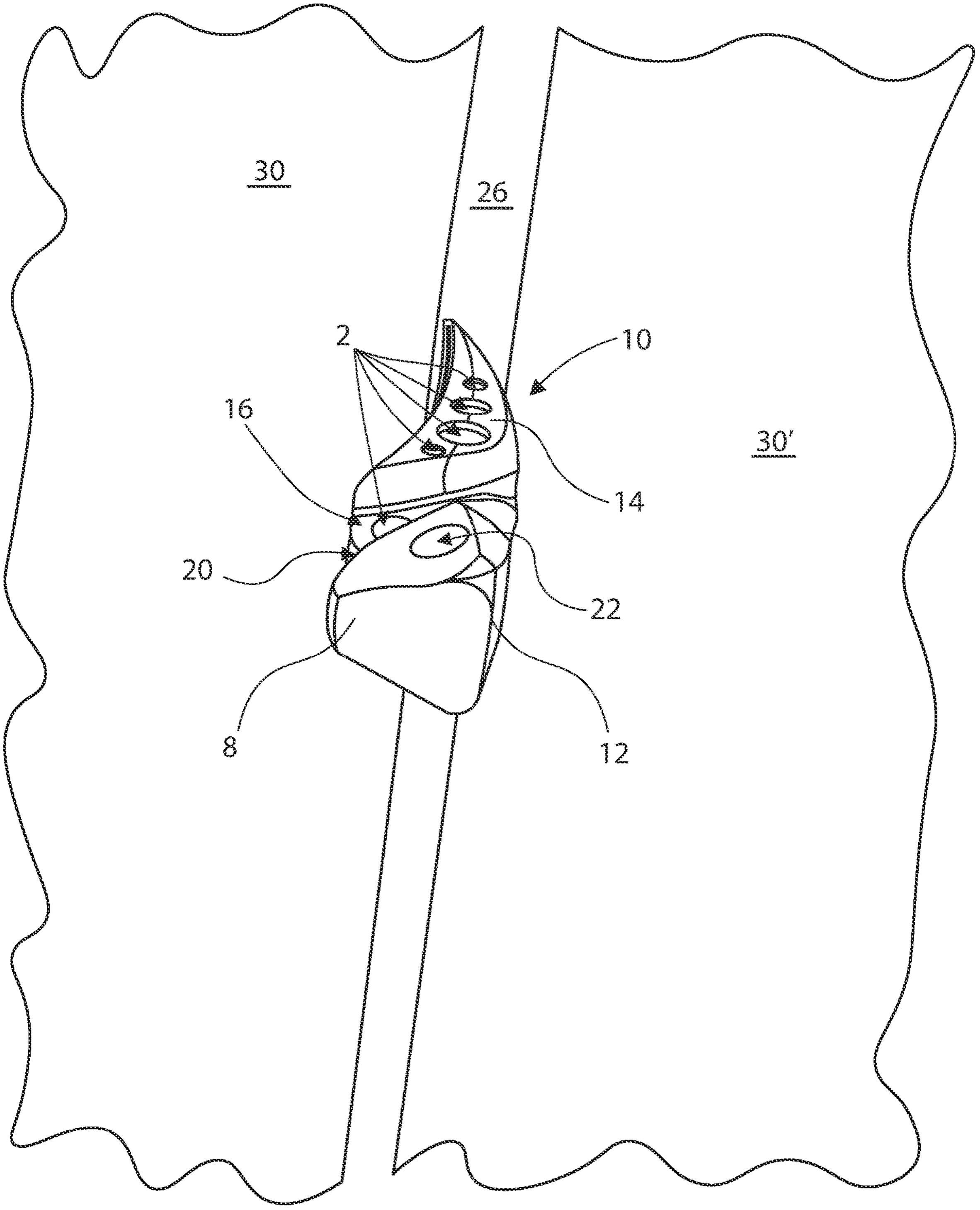
FIG. 4 illustrates the rescue access wedge forcibly inserted between a door and a door jamb enabling access to disengage a lock or otherwise enable entry through the doorway.
Figure 5:
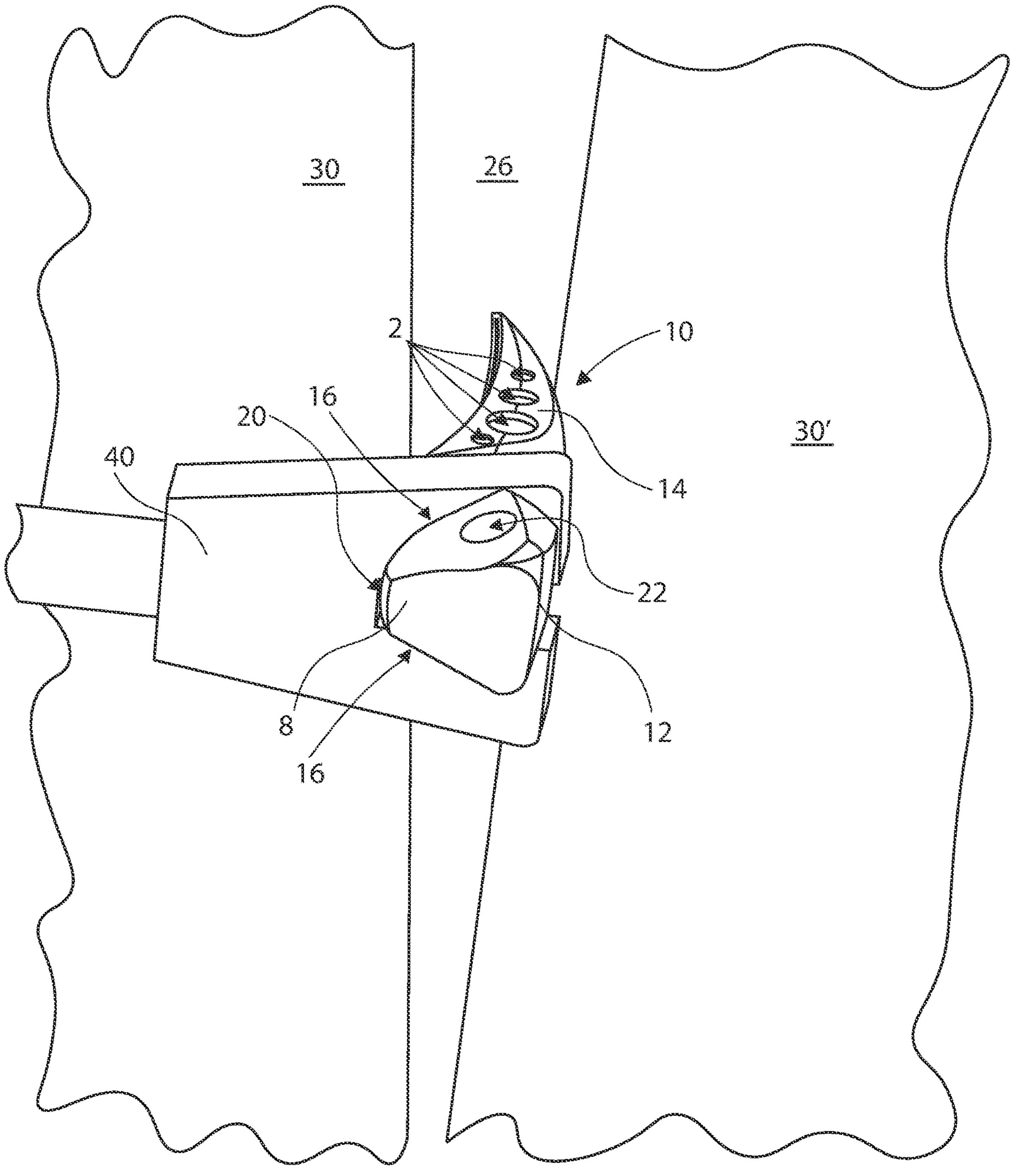
FIG. 5. Illustrates a halligan bar coupled to opposed aligned slots of the rescue access wedge in use.
Figure 6:
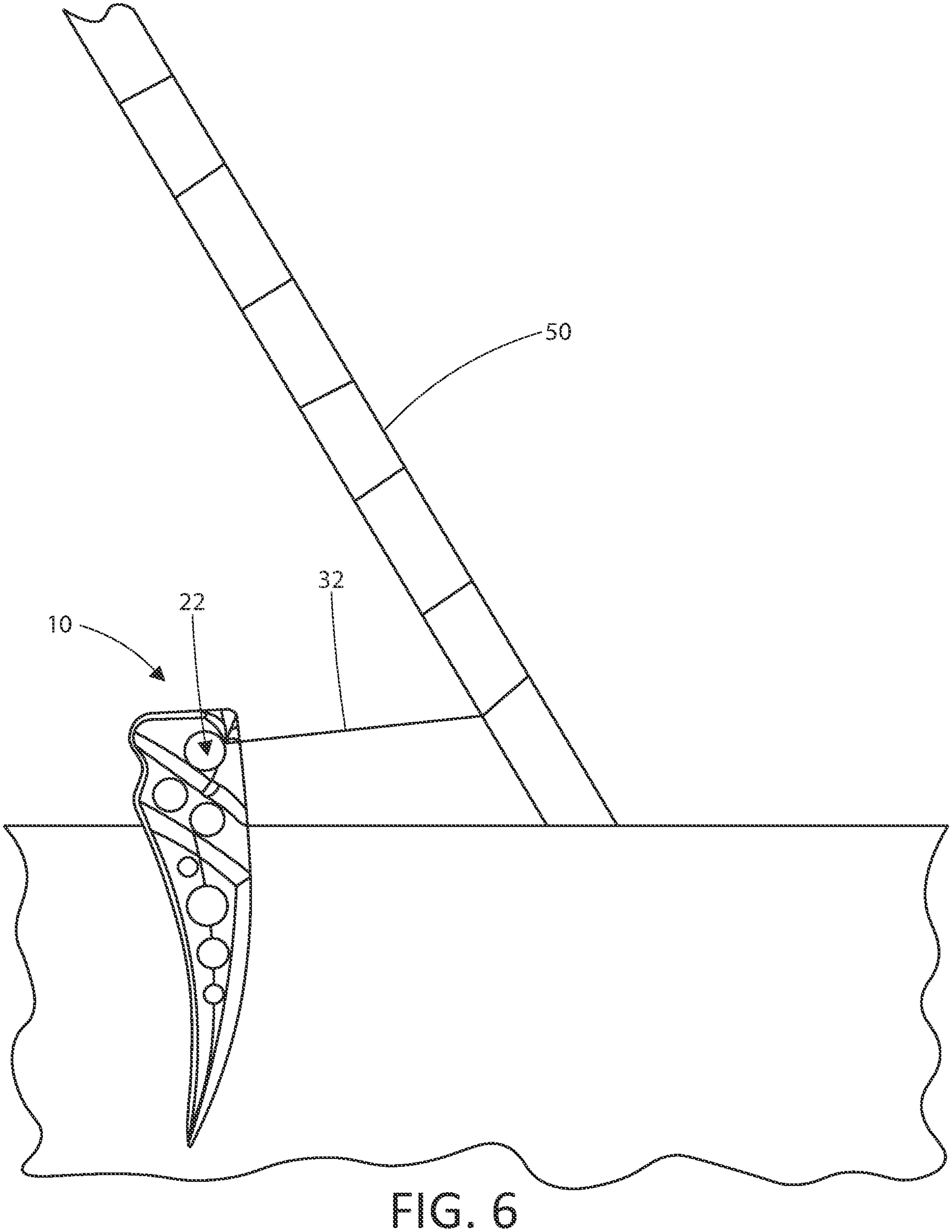
FIG. 6 illustrates use of this rescue access wedge as a ladder anchor.

As illustrated in the exemplary embodiment illustrated in FIGS. 1—and exemplified in FIGS. 4-6, embodiments of the present rescue access wedge 10 are configured to provide multiple features and functionalities. The overall configuration of the present rescue access wedge 10 provides a relatively lightweight and compact multi-purpose tool that is readily carried, gripped and inserted into gaps and materials in order to facilitate forcible entry, as well as, demolition, shoring, and tethering.

As illustrated, the present rescue access wedge 10 includes a bottom layer 12 that spans the length of the tool, and a pair of opposed side surfaces 14 angled upwardly from the bottom layer 12 and tapering from a taller back portion 16 to an acute angle in a front portion 18. The base portion 12 and sidewalls of rear portion 8 and generally triangular-shaped front portion 14 includes holes 2, 4, 6, 22.

Aligned paired holes 22 may be employed to receive a carabiner or otherwise tether the rescue access wedge to a firefighter's turn out gear. or another tool. Some embodiments configures a hole 4 for seating on a pike of a halligan bar.

In particular, features of various embodiments of the present rescue access wedge 10 include aligned channels providing slots 16 disposed on opposed side surfaces. As further shown in the illustrated embodiment, slots 16 may be angled upwardly toward tip 18 and configured to couple with paired prongs of a forked lever end of a rescue tool 40, such as shown in FIG. 5 illustrating how coupling aligned slots 16 with such a long handled tool provides leverage amplifying torque applied to the wedge 10.

Forcible prying and opening of a locked door 30 may be further enhanced by striking a surface of rescue access wedge 10 with a sledge or other striking tool. The combination of leveraging force by pulling and pushing a coupled rescue tool 40 such as, for example, a halligan bar, while applying force to a striking face of rescue access wedge 10 amplifies the torque or force applied to the wedge to thereby facilitate showing concavity 20 between door 30 and door jamb 30', as shown in FIG. 5. Rescue tool 10 thus facilitates or enables forcible entry through highly secured, heavy-duty doors of steel or similar materials or otherwise reinforced construction.

Aligned paired slots 16 recessed in the side walls adjoining rear portion 8 and front portion 14 are angled for coupling with a fork end of rescue tool 40 so as to juxtaposition rescue tool 24 at an angle that facilitates adapting the trajectory of force and reach in order to grab and/or strike a target wedge face. The illustrated embodiment further features a striking face on rear portion 8 oriented to focus applied force toward the center of the triangular-shape wedge body in order to direct impact torque to the material in which rescue access wedge 10 is seated.

A further feature of rescue access wedge 10 are one or more concavities 20 toward a rear portion 8 of the rescue access wedge 10 configured to facilitate seating the rescue access wedge 10 on abutting surfaces to prevent driving the wedge 10 through a gap or material, such as best shown in FIG. 4. Concavity 20 may be a notch with curvilinear or linear edges proximate to the rear portion 8 of rescue access wedge 10 on one or both opposed top and bottom surfaces perpendicularly disposed to the side surfaces.

As also shown in the illustrated embodiment of FIGS. 1-6, at least one of the holes may be configured in a teardrop-shaped nail puller 6. The tapered end of the teardrop nail puller 6 is oriented toward the acute angled front portion of the rescue access wedge 10 so application of compressive force to rear portion 18 is efficaciously transmitted=to a nail coupled to the teardrop end of hole 6. Aligned slots 16 and concavity 20 on respective surfaces toward rear portion 8, combined with the directional force, provided by rescue access wedge 10 to facilitate removal of nails and other fasteners.

A yet further feature of the various embodiments as illustrated in the various FIGs. are rounded edges and corners whereby annoying or harmful contact with sharp or pointed surfaces are prevented.

Various embodiments of the inventive method for using a rescue access wedge, such as exemplified in FIGS. 4 and 5, include steps of providing a rescue access wedge 10 having a base portion 12 and two sidewalls extended upwardly from base portion 12, wherein the two sidewalls extend from rear portion 8 to a tip 18 of a tapered front portion; wherein at least one hole 4 is disposed in base portion 12. Some embodiments include opposed holes 22 disposed in paired alignment in the rear portion 8 for receiving a tether line. A further feature of various embodiments includes a pair of opposed slots 16 adjoining the rear portion 8 and the front portion 14 are configured for receiving a fork end of a rescue tool 40 about the opposed slots 16 such that the fork end is in seated engagement with opposed slots 16. As further shown in FIGS. 4 and 5, applying force by striking the thus seating rescue tool while tip 18 is lodged in gap 26 between a side edge of door 30 and door jamb 30' drives the front portion toward gap 26 leverages and thereby enhances force needed to forcibly open door 30.

A yet further step of the various embodiments includes the step of seating the concavity 20 disposed in a top or bottom surface upon an abutted surface such as between door 30 and door jamb 30' to thereby stay the rescue access wedge within gap 26.

An advantage imparted by so seating of the concavity 20 of the rescue access wedge 10 into the gap 26 between a door 30 and door jamb 28, or other material is eliminating or minimizing having to manually hold or reposition the rescue access wedge 10 in place while applying such force and thereby reducing the risk of collaterally striking and injuring to the firefighter or other rescue worker.

By facilitating such leveraged force, a salient utility of the rescue access wedge 10 is to forcibly pry or prop open windows and hinged doors such as door 30 illustrated in part in FIGS. 4 and 5, particularly through a tight-fitting and/or reinforced locked door is provided by shoving tip 18 between a door 30 side edge and door jamb 28 so a blade to disengage a spring lock can then be inserted.

As illustrated in FIG. 6, a particular functionality imparted by aligned holes 22 in opposed side surfaces of the tall back portion provide anchor points to attach tether line 32 to a ladder 50 when rescue access wedge 10 is embedded in a stable material. As illustrated, angling of the front portion of rescue access wedge 10 buttresses and thus prevents slippage of the bottom of the ladder 50.

Yet further features of various embodiments of rescue access wedge 10 may include a textured surface such as, for example, transversely disposed recesses or ridges on an upper and/or lower surface to enhance traction of the abutting wedge/door edge and or other adjacent surface. In some embodiments, reflective, fluorescent and/or luminescent coating may be incorporated in a surface of rescue access wedge 10. Various embodiments may further feature incorporating a buoyant material to facilitate flotation.

Embodiments may also include on or more aperture wrenches disposed in an arm. Such an aperture wrench can be configured in various shapes and sizes adapted to particular functionalities that could include configurations that are rounded, ovoid, teardrop, parabolic, rectangular, square, triangular, pentagonal or hexagonal or some other configuration. For example, the periphery could be rectangular for coupling with a typical oxygen tank valve, or hexagon shape for coupling with a hydrant or hose coupling or natural gas tank valve. Hence, modifications, permutations, additions and sub-combinations are embraced by the spirit and scope of the invention. Hence, such and other variations are included in the scope of the invention, described, illustrated and claimed herein. It can therefore be seen that the scope of the present invention is not delimited by the literal language of this specification and the appended claims.

The invention claimed is:

1. A rescue access wedge comprising:

a base portion and a pair of opposed sidewalls extended upwardly from the base portion, wherein the pair of sidewalls define a rear portion and extend in a tapered front portion to converge with the base portion in a tip; and opposed slots recessed in paired transverse alignment into the pair of sidewalls flanking a recessed bridge having a top surface and a bottom surface, wherein the opposed slots are disposed between the rear portion and the front portion;

wherein the opposed slots are angled upwardly away from the tapered front portion such that coupled engagement with a fork end of a rescue tool exerts a compressive force toward a distal end of the fork end of the rescue tool amplifies leverage applied to the rescue access wedge.

2. The rescue access tool of claim 1, further comprising at least one recessed surface disposed in the top surface or a bottom surface between the rear portion and the front portion, wherein the recessed surface is configured to seat the rescue access wedge upon an abutting surface so as to resist pushing the rescue access wedge through a gap or material shoved into.

3. The rescue access wedge of claim 1, wherein at least one hole is disposed in the base portion or the pair of opposed sidewalls.

4. The rescue access wedge of claim 1, wherein at least an interior portion of the area within the base portion and the pair of opposed sidewalls is hollow.

5. The rescue access wedge of claim 3, wherein the at least one hole is tapered to form a teardrop shape.

6. The rescue access wedge of claim 5, wherein the edges of the at least one hole are beveled in a gradual upward taper from the edge.

7. The rescue access wedge of claim 3, wherein the at least one hole includes at least two holes, and wherein the two holes are aligned in opposed sidewalls of the rear portion such that the two holes are capable of receiving a tether line for securing an object.

8. The rescue access wedge of claim 1, wherein the opposed slots taper inwardly toward the top surface.

9. The rescue access wedge of claim 1, wherein at least a portion of the top surface or the bottom surface includes a non-slip surface for gripping comprising transversely disposed recesses or ridges.

10. The rescue access wedge of claim 1, further comprising a buoyant material for flotation.

11. The rescue access wedge of claim 1, further comprising a reflective material for visibility in a low light condition.

12. A rescue access wedge comprising:

a base portion and a pair of opposed sidewalls extended upwardly from the base portion, wherein the pair of sidewalls define a rear portion and extend in a tapered front portion to converge with the base portion in a tip;

a pair of opposed slots recessed in parallel alignment in the pair of sidewalls between the rear portion and the front portion, wherein the pair of opposed slots are angled upwardly so as to engage the fork end of a rescue tool whereby a compressive force is exerted toward a distal end of the fork end of the rescue tool to thereby amplify leverage applied to the rescue access wedge.

13. The rescue access tool of claim 12, further comprising at least one recessed surface disposed in a top surface or bottom surface between the rear portion and the front portion, wherein the at least one recessed surface stays the rescue access wedge upon an abutting surface so as to resist pushing the rescue access wedge through a gap or material shoved into.

14. The rescue access tool of claim 12, wherein at least an interior portion of the area within the base portion and the pair of sidewalls is hollow.

15. The rescue access wedge of claim 14, wherein the plurality of holes includes at least one hole in the base portion.

16. The rescue access wedge of claim 15, wherein at least one hole in the base portion is tapered to form a teardrop shape, and wherein the edges of the at least one hole are beveled in a gradual upward taper from the edge.

17. The rescue access wedge of claim 14, wherein the at least one hole includes at least pair of holes disposed in opposed parallel alignment in the rear portion such that the two opposed holes are capable of receiving a tether line for tethering for securing an object.

18. The rescue access wedge of claim 12, wherein the rescue tool at least a portion of a lower surface or an upper tapered surface include a non-slip surface for gripping comprising transversely disposed recesses or ridges.

19. A method for using a rescue access wedge for forcible entry through a door, comprising the steps of:

providing the rescue access wedge having a triangular-shaped body with a base portion and a pair of opposed sidewalls extending upwardly from a bottom surface to a top surface, and wherein the pair of opposed sidewalls extend from a rear portion to a tapered front portion, wherein a concavity is disposed in the top surface or the bottom surface, and wherein a pair of opposed slots disposed between the rear portion and the front portion are configured for receiving a fork end of a rescue tool;

shoving an end of the tapered front portion in a gap between a door edge and door jamb;

inserting the fork end of the rescue tool about the opposed slots of the recessed bridge such that the fork end is in seated engagement with the recessed bridge; and applying a compressive force toward a distal end of the fork end of the rescue tool so as to forcibly open the door.

20. The method of claim 19, further comprising the step of seating the recessed surface disposed in a top surface or a bottom surface upon an abutted surface to thereby stay the rescue access wedge within the gap.

* * * * *